J. GOETZ, W. K. BUXBAUM & F. A. PARSONS.
LUBRICATING SYSTEM FOR MILLING MACHINE SADDLES.
APPLICATION FILED OCT. 16, 1913.
1,087,364.
Patented Feb. 17, 1914.
2 SHEETS—SHEET 1.
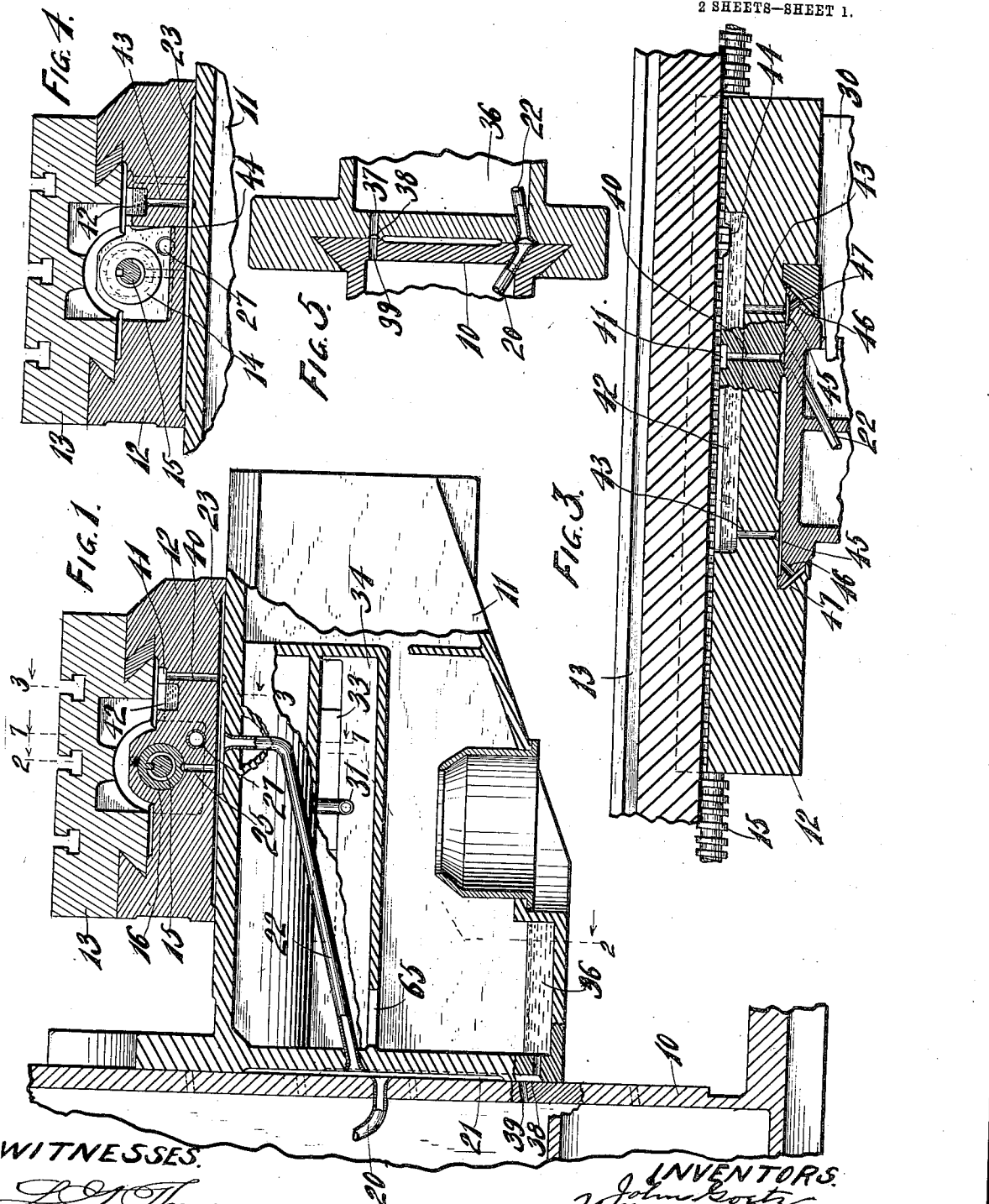

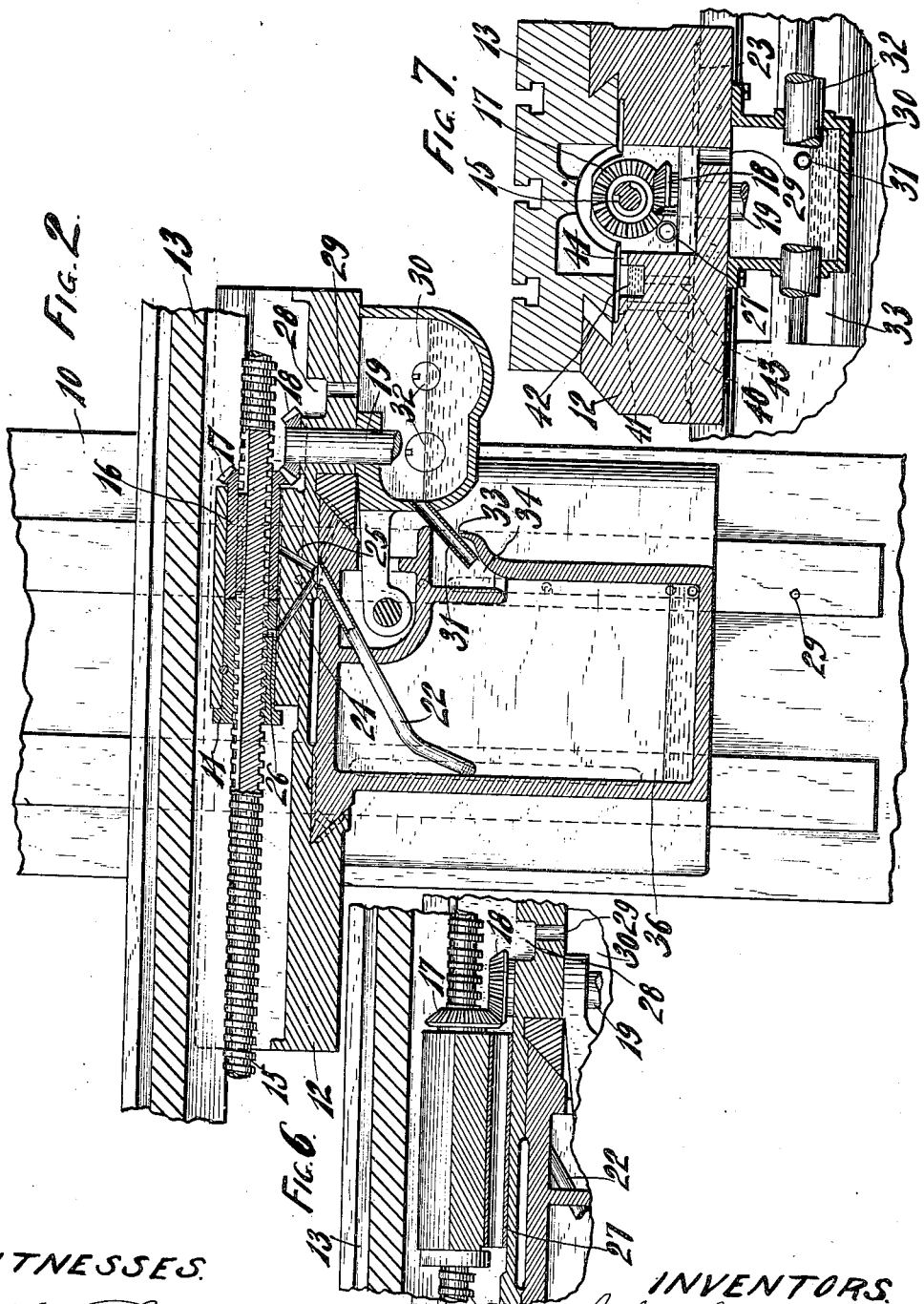

UNITED STATES PATENT OFFICE.

JOHN GOETZ, OF WEST ALLIS, AND WILLIAM K. BUXBAUM AND FRED A. PARSONS, OF MILWAUKEE, WISCONSIN.

LUBRICATING SYSTEM FOR MILLING-MACHINE SADDLES.

1,087,364.　　　　Specification of Letters Patent.　　Patented Feb. 17, 1914.

Application filed October 16, 1913. Serial No. 795,412.

*To all whom it may concern:*

Be it known that we, JOHN GOETZ, a citizen of the United States, and resident of West Allis, in the county of Milwaukee and State of Wisconsin, and WILLIAM K. BUXBAUM and FRED A. PARSONS, citizens of the United States, and residents of Milwaukee, in the county of Milwaukee and State of Wisconsin, have invented new and useful Improvements in Lubricating Systems for Milling-Machine Saddles, of which the following is a description, reference being had to the accompanying drawings, which are a part of this specification.

This invention has for its object to provide a force feed lubricating system with return flow for lubricating the various bearings of a milling machine saddle without interfering with the movements of the saddle or other parts.

Another object of the invention is to provide such a force feed lubricating system for milling machine saddles with a reservoir for storing a supply of lubricant in the saddle for lubricating the bearings of the saddle on the knee at the beginning of the operation of the machine after the machine has been standing idle and before the oil reaches these parts on starting the circulation, such reservoir being incapable of being drained by siphon action of the lubricating system.

With the above and other objects in view the invention consists in the lubricating means as herein claimed and all equivalents.

Referring to the accompanying drawings in which like characters of reference indicate the same parts in different views: Figure 1 is a sectional elevation of the knee of a milling machine with its associated parts having the lubricating system of this invention incorporated therein; Fig. 2 is a sectional elevation on a plane at right angles to the sectional plane of Fig. 1 and following line 2—2 of Fig. 1; Fig. 3 is a sectional view being in the same direction as in Fig. 2 but on the plane of line 3—3 of Fig. 1; Fig. 4 is a sectional view looking in the direction of Fig. 1 and taken beyond the end of the feed nut which is sectioned in Fig. 1; and, Fig. 5 is a sectional plan view of the sliding connection of the knee on the frame. Figs. 6 and 7 are fragmentary views showing details of construction.

In these drawings 10 indicates a frame or casing on which a knee member 11 is mounted to slide vertically in the usual manner and as shown in Fig. 5. This knee member 11 has its upper edges dovetailed into a saddle member 12 which is thereby made slidable on the knee member toward and from the casing 10 and has a table 13 dovetailed into its upper surface to be slidable thereon at right angles to the line of movement of the saddle on the knee, all as in the common construction of milling machines.

The saddle member 12 has keyed within it a stationary nut 14 through which threads the feed screw 15 of the table in the usual manner and within the same opening of the saddle there is loosely mounted a sleeve 16 which is splined to the feed screw 15 and serves to turn the feed screw to produce a power driven feed of the table, the sleeve 15 being provided with a beveled pinion 17 at its end meshing with a corresponding beveled pinion 18 on a suitably driven vertical shaft 19 for that purpose.

Our invention is designed to provide a flow of lubricant to these various moving parts of the saddle, including the bearings of the saddle on the knee.

A suitable source of lubricant supply under pressure, which is not shown, delivers a flow of lubricant through a supply pipe 20 to the bearing for the knee on the frame 10 and the knee bearing has a longitudinal groove 21 registering with the end of the supply pipe and communicating with a feed pipe 22 so that communication between the supply pipe 20 and the feed pipe 22 is maintained in all adjustments of the knee. The feed pipe 22 extends to the upper bearing surface of the knee where it registers with a groove 23 in the bottom of the saddle 12. This groove 23 has a pair of diverging passageways 24 and 25 leading upwardly from it, the former extending to an opening 26 in the stationary nut 14 to deliver oil to the threads of said nut and the other passageway 25 leading to the bearing of the sleeve 16 to deliver lubricant thereto. Owing to the fact that the keyway in the feed screw 15 comes into register with the oil feeding opening 26 at each revolution thereof there is a surplus of oil fed through these parts and the top of the saddle 12 is hollowed out to form a receptacle into which the oil drains. The portion of the saddle in which the stationary nut 14 and the sleeve 16 are contained stands as a partition between the oil receptacle or drip pan at the two ends of the saddle 12, but a passageway 27 is formed therethrough and the oil falling into the lefthand end of the saddle, as shown in Figs. 2 and 6, drains through the passageway 27 into a well 28 at the other end of the saddle, part of the oil passing through an opening leading to the bearing of shaft 19. From the well 28 the oil passes through an opening 29 to the interior of a gear casing 30 which is usually carried by the saddle and it is held within this casing until it reaches the level of a spout 31. This level is sufficient to reach the bearings of shafts 32 which are journaled in the gear casing. The spout 31 projects through a slot 33 in the knee and is capable of traveling through said slot without interfering with the movement of the saddle on the knee. The oil discharged from the spout 31 through the slot 33 enters a small compartment 34 which has an opening 35 at its end permitting the oil to run into the main chamber 36 of the knee and the oil in this main chamber 36 returns to the casing 10 from which it was originally pumped through an opening 37 leading from the bottom of the chamber 36 to a vertical groove 38 in the bearing surface of the knee and through one of a number of openings 39 of the casing 10 at different elevations registering with such groove.

Besides the circuit of travel of the lubricant which is returned to the casing as just described the invention provides for another flow of lubricant to the slide bearings of the saddle. For this purpose a passageway 40 extends upwardly from the groove 23 in the bottom of the saddle, this being the groove which as before described receives oil under pressure from the oil feed pipe 22, and the passageway 40 enters a recess 41 in the top of the saddle which is positioned alongside of and empties into a reservoir or trough 42. The trough 42 extends lengthwise of the saddle, or parallel with the feed screw 15 and has passageways 43 leading from it to the slide bearings of the saddle, but the surplus oil may overflow therefrom through a notch 44 in its sidewall into the well 28 from which it is drained through the opening 29 as before described. The passageways 43 communicate with grooves 45 on the bearing surface of the knee and inclined passageways 46 through the bearing flanges of the knee convey lubricant from the groove 45 to grooves 47 in the undercut bearing surface of the saddle so that the oil contained in the reservoir or trough 42 may freely flow to the bearing surfaces of the saddle on the knee and is thus capable of lubricating these bearing surfaces at all times, even when the lubricating system has had the oil drained therefrom by the machine remaining idle for some length of time.

In operation the supply of lubricant under pressure is delivered from the lubricant supply pipe 20 to the feed pipe 22 in all of the vertical adjustments of the knee and is conveyed to the transverse groove 23 in the bottom of the saddle which not only supplies the interior of the stationary feed nut 14 and the bearing of the driving sleeve 16, but through the passageway 40 it serves to supply lubricant to the trough or reservoir 42 from which the bearings of the saddle on the knee are furnished with lubricant. The overflow of oil from the nut, the sleeve and the reservoir is caught by the well 28 from which it passes through the opening 29 into the gear casing 30 where it serves to lubricate parts therein and is then discharged through the spout 31 and the slot 33 of the main chamber of the knee and through the registering openings 37 and 39 to the casing of the milling machine from which it was originally drawn. The working parts of the saddle are thus copiously supplied with lubricant at all times while the machine remains in operation, and the bearings of the saddle on the knee are lubricated from the reservoir well 42 in such a manner that their supply cannot be siphoned back into the milling machine casing when the machine is at rest, and they are therefore ready for duty immediately upon the starting of the machine.

What we claim as new and desire to secure by Letters Patent is:

1. In a saddle lubricating system for milling machines, the combination with a milling machine, of a lubricant supply pipe leading to the knee bearing of the frame, and a feed pipe in the knee having communication with the lubricant supply pipe and terminating at the saddle bearing on the knee, there being a groove in the bearing surface of the saddle on the knee with which the feed pipe registers in the different positions of the saddle, said groove having passageways leading from it to the interior of the feed nut and to the bearing of the driving sleeve for the feed screw.

2. In a saddle lubricating system for milling machines, the combination with a milling machine, of a lubricant supply pipe terminating at the knee bearing of the casing, there being a groove in the bearing of the knee registering with the lubricant supply pipe in different positions of the knee, a feed pipe in the knee communicating with the said groove and terminating in the saddle bearing on the knee, there being a groove in the bearing surface of the saddle registering with the feed pipe in different positions of the saddle, the last mentioned groove having passageways leading from it to the interior of the stationary nut of the feed screw and to the bearing for the driving sleeve splined on the feed screw, a reservoir formed in the saddle and having a passageway leading to the upper part thereof from the said last mentioned groove, a well in the saddle receiving overflow lubricant from the reservoir and from the stationary nut and the driving sleeve, there being passageways leading from the reservoir to the bearings of the saddle on the knee, and means for returning the lubricant from the well to the casing of the milling machine.

3. In a saddle lubricating system for milling machines, the combination with a milling machine, of a lubricant supply pipe terminating at the knee bearing of the casing, there being a groove in the bearing of the knee registering with the lubricant supply pipe in different positions of the knee, a feed pipe in the knee communicating with the said groove and terminating in the saddle bearing on the knee, there being a groove in the bearing surface of the saddle registering with the feed pipe in different positions of the saddle, a reservoir formed in the saddle and having a passageway leading to the upper part thereof from the last mentioned groove, and passageways leading from the reservoir to the bearings of the saddle on the knee.

4. In a saddle lubricating system for milling machines, the combination with a milling machine, of a lubricant supply pipe terminating at the knee bearing of the casing, there being a groove in the bearing of the knee registering with the lubricant supply pipe in different positions of the knee, a feed pipe in the knee communicating with the said groove and terminating in the saddle bearing on the knee, there being a groove in the bearing surface of the saddle registering with the feed pipe in different positions of the saddle, the last mentioned groove having passageways leading from it to the interior of the stationary nut of the feed screw and to the bearing for the driving sleeve splined on the feed screw, a reservoir formed in the saddle and having a passageway leading to the upper part thereof from the said last mentioned groove, a well in the saddle receiving overflow lubricant from the reservoir and from the stationary nut and the driving sleeve, there being passageways leading from the reservoir to the bearings of the saddle on the knee, means for returning the lubricant from the well to the casing of the milling machine, a passageway leading from the well to the gear casing of the saddle, and a spout leading from the gear casing of the saddle at the level of the bearings therein and projecting through a slot in the knee to discharge lubricant into the chamber within the knee, there being an opening through the knee leading from said chamber and a groove in the bearing surface of the knee registering with said opening, and there being a series of openings through the casing of the milling machine registering with said groove for returning oil from the chamber of the knee to the casing of the milling machine.

5. In a saddle lubricating system for milling machines, the combination with a milling machine, of a lubricant supply pipe terminating at the knee bearing of the casing, there being a groove in the bearing of the knee registering with the lubricant supply pipe in different positions of the knee, a feed pipe in the knee communicating with the said groove and terminating in the saddle bearing on the knee, there being a groove in the bearing surface of the saddle registering with the feed pipe in different positions of the saddle, the last mentioned groove having passageways leading from it to the interior of the stationary nut of the feed screw and to the bearing for the driving sleeve splined on the feed screw, a well in the saddle receiving overflow lubricant from the driving sleeve, the top of the saddle forming a drip receptacle to collect the surplus oil fed to the nut, there being an opening through the saddle from the drip receptacle to the well, and means for returning the lubricant from the well to the casing of the milling machine.

In testimony whereof, we affix our signatures, in presence of two witnesses.

JOHN GOETZ.
WILLIAM K. BUXBAUM.
FRED A. PARSONS.

Witnesses:
R. S. C. CALDWELL,
KATHERINE HOLT.